United States Patent
Raghavan et al.

(10) Patent No.: US 9,753,842 B2
(45) Date of Patent: Sep. 5, 2017

(54) SYSTEM AND METHOD FOR CREATING UNIVERSAL TEST SCRIPT FOR TESTING VARIANTS OF SOFTWARE APPLICATION

(71) Applicant: Wipro Limited, Bangalore (IN)

(72) Inventors: Girish Raghavan, Chennai (IN); Ganesh Narayan, Bangalore (IN); Thamilchelvi Peterbarnabas, Chennai (IN); Balasubramanian Sankara Sivarama Krishnan, Chennai (IN)

(73) Assignee: Wipro Limited, Bangalore (IN)

( * ) Notice: Subject to any disclaimer, the term of this patent is extended or adjusted under 35 U.S.C. 154(b) by 236 days.

(21) Appl. No.: 14/313,441

(22) Filed: Jun. 24, 2014

(65) Prior Publication Data
US 2015/0324274 A1 Nov. 12, 2015

(30) Foreign Application Priority Data
May 9, 2014 (IN) .......................... 2308/CHE/2014

(51) Int. Cl.
*G06F 9/44* (2006.01)
*G06F 11/36* (2006.01)

(52) U.S. Cl.
CPC ...... *G06F 11/3684* (2013.01); *G06F 11/3672* (2013.01); *G06F 11/3688* (2013.01)

(58) Field of Classification Search
CPC .................................... G06F 11/3668–11/3692
See application file for complete search history.

(56) References Cited

U.S. PATENT DOCUMENTS

| 5,754,755 | A | 5/1998 | Smith, Jr. |
| 7,296,188 | B2 * | 11/2007 | Paternostro ......... G06F 11/3684 714/38.14 |
| 7,305,659 | B2 | 12/2007 | Muller et al. |
| 7,444,397 | B2 | 10/2008 | Linville et al. |
| 7,680,668 | B2 | 3/2010 | Voruganti |
| 8,239,835 | B2 | 8/2012 | Rex et al. |

(Continued)

OTHER PUBLICATIONS

Thomas J.Ostrand et al., "The Category-Partition Method for Specifying and Generating Functional Tests", [Online], 1988, pp. 676-686, [Retrieved from Internet on Jul. 7, 2017], <http://staff.unak.is/andy/MScTestingMaintenance/Lectures/CategoryPartitionMethod1988.pdf>.*

(Continued)

*Primary Examiner* — Ziaul A Chowdhury
(74) *Attorney, Agent, or Firm* — LeClairRyan, a Professional Corporation (57) ABSTRACT

The present subject matter relates to a method, device, and computer readable medium for creating universal test scripts for testing variants of software applications. The method comprises receiving, by a test automation computing device, one or more test cases from a test management system. Keyword functions and sequences are identified corresponding to sequence of steps in the one or more test cases. The universal test script is generated based on the keyword functions and the sequences, wherein the keyword functions comprise test parameters. Test objects and test data are delinked from the universal test script. The test objects and the test data are binded to the universal test script based on the test parameters, while executing the universal test script on an automation tool, wherein the test objects and the test data are specific to the variant of the application.

9 Claims, 6 Drawing Sheets

(56) References Cited

U.S. PATENT DOCUMENTS

| | | | | |
|---|---|---|---|---|
| 8,347,147 B2* | 1/2013 | Adiyapatham | ..... | G06F 11/3672 714/38.1 |
| 8,645,341 B2* | 2/2014 | Salman | ............... | G06F 11/3672 707/695 |
| 9,104,810 B2* | 8/2015 | Zhang | ................. | G06F 11/3684 |
| 9,684,587 B2* | 6/2017 | Gibbens | ............. | G06F 11/3688 |
| 2004/0103396 A1* | 5/2004 | Nehab | ................. | G06F 11/3684 717/127 |
| 2008/0092119 A1* | 4/2008 | Sweis | ....................... | G06F 8/74 717/124 |
| 2008/0222454 A1* | 9/2008 | Kelso | ................. | G06F 11/3688 714/38.14 |
| 2008/0263526 A1* | 10/2008 | Urra | .................... | G06F 11/3684 717/136 |
| 2008/0282231 A1* | 11/2008 | R | ........................ | G06F 11/3684 717/127 |
| 2008/0313611 A1 | 12/2008 | Linville et al. | | |
| 2009/0172649 A1* | 7/2009 | Teplitsky | ............. | G06F 11/3684 717/143 |
| 2009/0204945 A1 | 8/2009 | Jain et al. | | |
| 2009/0217303 A1* | 8/2009 | Grechanik | .......... | G06F 11/3414 719/320 |
| 2010/0229155 A1* | 9/2010 | Adiyapatham | ..... | G06F 11/3672 717/124 |
| 2012/0023485 A1 | 1/2012 | Dubey et al. | | |
| 2012/0260129 A1 | 10/2012 | Wilson et al. | | |
| 2013/0060507 A1* | 3/2013 | Kianovski | ........... | G06F 11/3684 702/123 |
| 2013/0097586 A1* | 4/2013 | Chandra | ............. | G06F 11/3684 717/124 |
| 2013/0159974 A1 | 6/2013 | Norton et al. | | |
| 2013/0232474 A1 | 9/2013 | Leclair et al. | | |
| 2013/0339798 A1 | 12/2013 | Choudhary et al. | | |
| 2013/0339930 A1* | 12/2013 | Xu | ....................... | G06F 11/3684 717/125 |
| 2014/0040667 A1 | 2/2014 | Zemer et al. | | |
| 2014/0109055 A1* | 4/2014 | Gibbens | ............. | G06F 11/3672 717/125 |
| 2014/0109061 A1* | 4/2014 | Gibbens | ............. | G06F 11/3688 717/126 |
| 2014/0181793 A1* | 6/2014 | Kaliappan | ........... | G06F 11/3684 717/124 |
| 2014/0325483 A1* | 10/2014 | Pilot | .................... | G06F 11/3684 717/124 |
| 2015/0287050 A1* | 10/2015 | Schmidt | ............. | G06Q 30/0201 705/7.29 |

OTHER PUBLICATIONS

Marc J. Baker, et al., "Automatic Generation of Test Scripts from Formal Test Specifications", [Online], ACM1989, pp. 210-218, [Retrieved from Internet on Jul. 7, 2017], <https://pdfs.semanticscholar.org/fe8a/7dbe02b496b9c24f15214410dfa2428b71be.pdf>.*

Gary Wassermann et al., "Dynamic Test Input Generation for Web Applications", [Online], 2008, pp. 1-11, [Retrieved from Internet on Jul. 7, 2017], <https://pdfs.semanticscholar.org/c67c/fac0225f9d20fb2606f1de5b33e29e325f6a.pdf>.*

Wu, et al., "The Study on an Intelligent General-Purpose Automated Software Testing Suite", [Online], 2010, pp. 993-996, [Retrieved from Internet on Jul. 7, 2017], <http://ieeexplore.ieee.org/stamp/stamp.jsp?arnumber=5523591>.*

* cited by examiner

SYSTEM AND METHOD FOR CREATING UNIVERSAL TEST SCRIPT FOR TESTING VARIANTS OF SOFTWARE APPLICATION

This application claims the benefit of U.S. Indian Patent Application Serial No. 2308/CHE/2014 filed May 9, 2014, which is hereby incorporated by reference in its entirety.

FIELD

The present subject matter is related, in general to software testing, and more particularly, but not exclusively to a method and a system for creating universal test script for testing variants of software application.

BACKGROUND

Testing is part of the software development process. The testing process includes verifying various aspects of the software's behavior, results, outputs, and the like, in connection with user supplied inputs.

A common phenomenon observed globally during software test automation of a software application which is developed for a particular functionality/domain is that the base application is taken as a baseline. Multiple variants of the software application, which could be region specific or certain business specific are created from the baseline application and released. These types of variant of the software application are typically planned with a very short project cycle time. For example, due to the global market for software applications, a particular software application may be internationalized (e.g., available in several languages). Therefore, it is typically necessary to test the application in each language in which it is available.

Software developers who customize the software, test the software and customizations to the software before releasing or distributing the software. The developers and entities that customize the software, test their software manually or spend significant resources creating an automated test script. A key requirement for testing such applications are to accelerate the testing through automation of test cases and executing them across all the variant releases, when any change is made to the baseline.

Several tools exist to assist in the development of test scripts. However, the existing tools generate test scripts that are specific to the user interfaces of the software applications that they are designed for. Even minor changes to the user interfaces of the software applications that the test scripts are designed for require significant changes in the test scripts to adapt them to the new user interface design. This is a technical challenge since even though the functional flow of the applications is almost same, variation in objects and the test data required are different across the various types of variant applications. In addition, maintenance and quicker reuse of the scripts with different test data is a challenge.

The existing test automation techniques do not completely address the problems stated above and lead to tedious as well as time consuming software test designing and automation process. Hence, there exists a need for a system and a method for generating universal test scripts for software testing across variants of the software application.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a computer implemented method for creating universal test script for testing variants of a software application. The method comprises receiving, by a test automation system, one or more test cases from a test management system. Upon receiving the one or more test cases, the method identifies keyword functions and sequences corresponding to sequence of steps in the one or more test cases. Further, the method comprises generating the universal test script based on the keyword functions and the sequences, wherein the keyword functions comprises test parameters. Further, test objects and test data are delinked from the universal test script. Finally, the test objects and the test data are binded to the universal test script based on the test parameters, while executing the universal test script on an automation tool, wherein the test objects and the test data are specific to the variant of the application.

In an aspect of the present disclosure, a test automation system for creating universal test script for testing variants of a software application is provided. The test automation system comprises a processor, and a memory communicatively coupled to the processor. The memory is configured to store processor-executable instructions, which, on execution, causes the processor to receive one or more test cases from a test management system. The processor is further configured to identify keyword functions and sequences corresponding to sequence of steps in the one or more test cases using the one or more test cases. Then, generate the universal test script based on the keyword functions and the sequences, wherein the keyword functions comprises test parameters. Further, the processor is configured to delink test objects and test data from the universal test script and bind the test objects and the test data to the universal test script based on the test parameters, while executing the universal test script on an automation tool, wherein the test objects and the test data are specific to the variant of the application.

In another aspect of the present disclosure, a non-transitory computer readable medium including instructions stored thereon is provided. The instructions when processed by at least one processor cause a test automation system to perform the acts of receiving one or more test cases from a test management system. The processor further causes the test automation system to identify keyword functions and sequences corresponding to sequence of steps in the one or more test cases, using the one or more test cases and generate the universal test script based on the keyword functions and the sequences, wherein the keyword functions comprises test parameters. Further, the processor causes the test automation system to delink test objects and test data from the universal test script, and bind the test objects and the test data to the universal test script based on the test parameters, while executing the universal test script on an automation tool, wherein the test objects and the test data are specific to the variant of the application.

The foregoing summary is illustrative only and is not intended to be in any way limiting. In addition to the illustrative aspects, embodiments and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
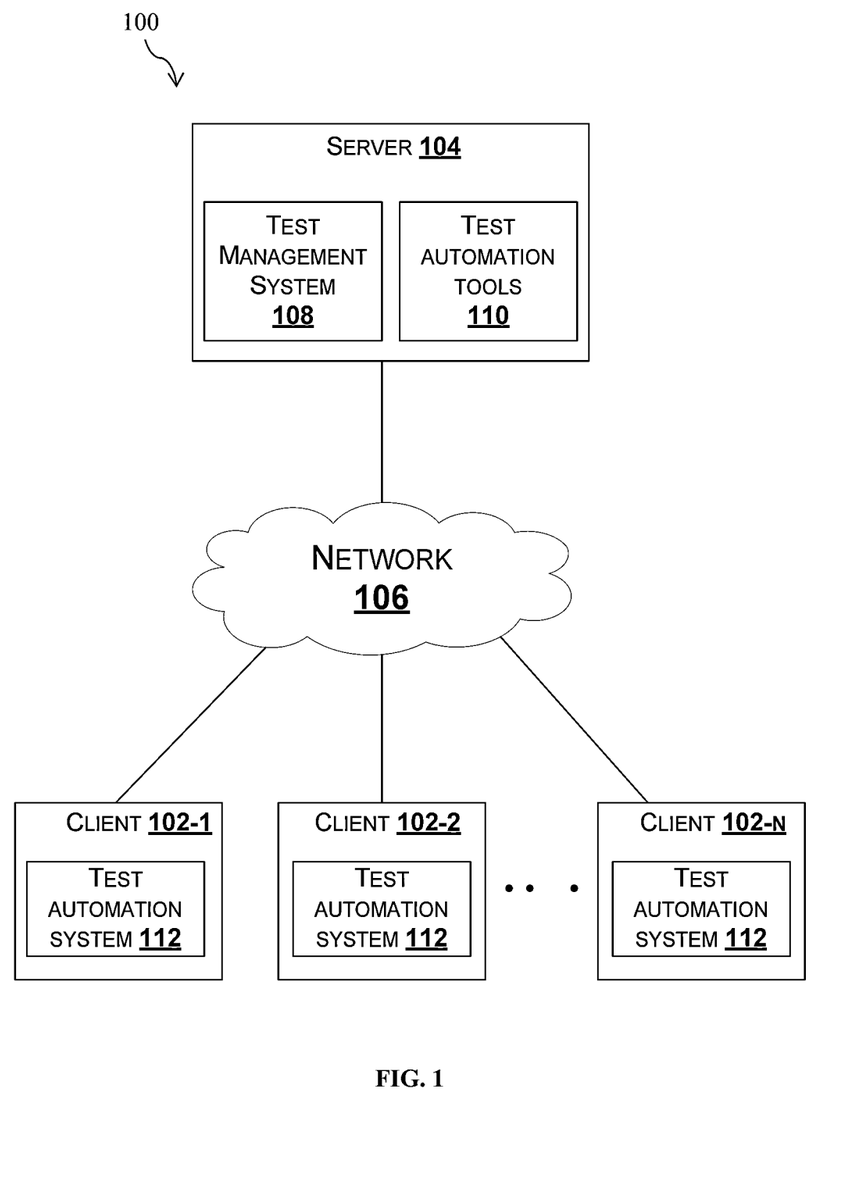
FIG. 1 illustrates a network environment for creating universal test script for testing variants of software application in accordance with some embodiments of the present disclosure.

FIG. 1 illustrates a network environment for creating universal test script for testing variants of software in accordance with some embodiment of the present disclosure.

As shown in FIG. 1, a system 100 for creating universal test script for testing variants of software comprises one or more components coupled with each other. In one implementation, the system 100 comprises one or more client devices 102-1, 102-2, . . . 102-N (collectively referred to as client devices 102). Examples of the client devices 102 include, but are not limited to, a desktop computer, a portable computer, a mobile phone, a handheld device, a workstation. The client devices 102 may be used by various stakeholders or end users of the organization, such as project managers, database administrators and application developers. As shown in the FIG. 1, such client devices 102 are communicatively coupled to a server 104 through a network 106 for facilitating one or more client devices 102 to access and/or operate a test management system (TMS) 108 and test automation tools 110 of the server 104.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

The client devices 102 comprises a test automation system 112 that may be implemented in a variety of computing systems, such as a laptop computer, a desktop computer, a notebook, a workstation, a mainframe computer, a server, a network server, and the like.

Figure 2:
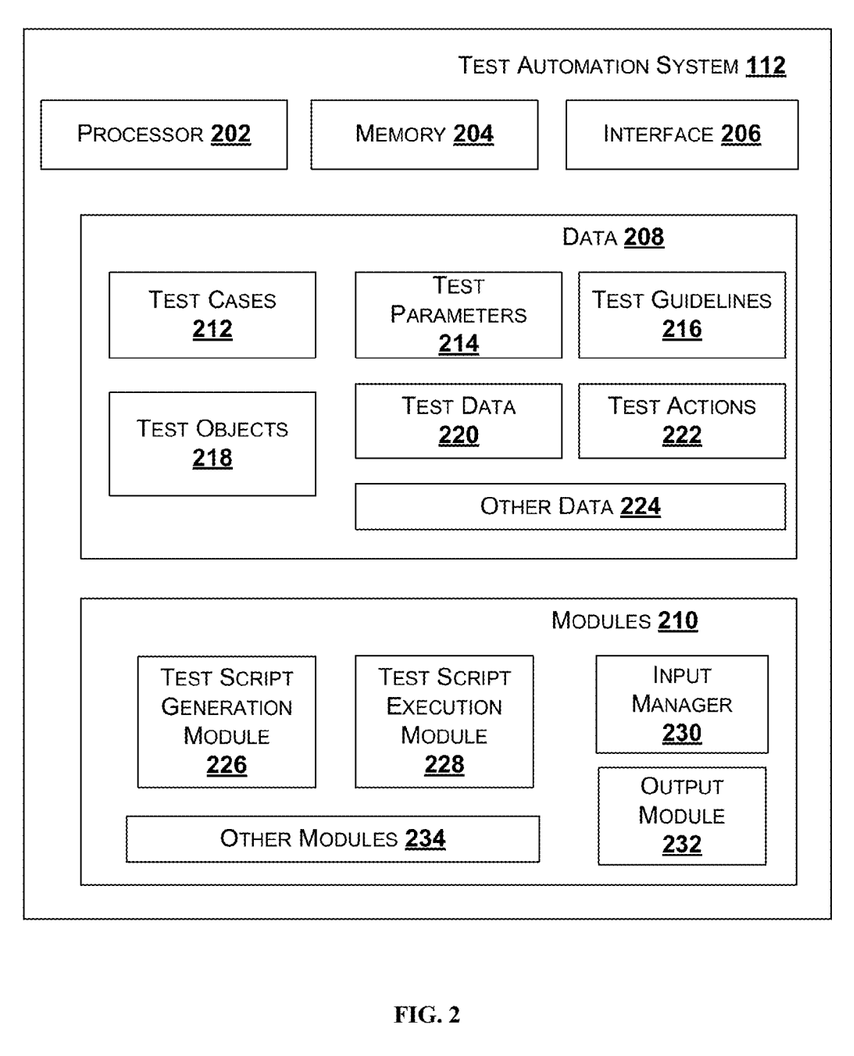
FIG. 2 illustrates a block diagram of test automation system for optimizing execution of test cases in accordance with some embodiments of the present disclosure.

In one implementation, the test automation system 112, as shown in FIG. 2, includes a central processing unit ("CPU" or "processor") 202, a memory 204 and an Interface 206. Processor 202 may comprise at least one data processor for executing program components and for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc. Among other capabilities, the processor 202 is configured to fetch and execute computer-readable instructions stored in the memory 204. The memory 204 can include any non-transitory computer-readable medium known in the art including, for example, volatile memory (e.g., RAM), and/or non-volatile memory (e.g., EPROM, flash memory, etc.).

The interface(s) 206 may include a variety of software and hardware interfaces, for example, a web interface, a graphical user interface, etc. The interface 206 is coupled with the processor 202 and an I/O device. The I/O device is configured to receive inputs from user via the interface 206 and transmit outputs for displaying in the I/O device via the interface 206.

In one implementation, the test automation system 112 further comprises data 208 and modules 210. In one example, the data 208 and the modules 210 may be stored within the memory 204. In one example, the modules 210, amongst other things, include routines, programs, objects, components, and data structures, which perform particular tasks or implement particular abstract data types. The modules 210 may also be implemented as, signal processor(s), state machine(s), logic circuitries, and/or any other device or component that manipulate signals based on operational instructions. Further, the modules 210 can be implemented by one or more hardware components, by computer-readable instructions executed by a processing unit, or by a combination thereof.

In one implementation, the data 208 may include, for example, test cases 212, test parameters 214, test guidelines 216, test objects 218, test data 220, test actions 222 and other data 224. In one embodiment, the data 208 may be stored in the memory 204 in the form of various data structures. Additionally, the aforementioned data can be organized using data models, such as relational or hierarchical data models. The other data 224 may be used to store data, including temporary data and temporary files, generated by the modules 210 for performing the various functions of the test automation system 112.

The modules 210 may include, for example, a test script generation module 226, a test script execution module 228, an input manager (IM) 230 and an output module 232 coupled with the processor 202. The test automation system 112 may also comprise other modules 234 to perform various miscellaneous functionalities of the test automation system 112. It will be appreciated that such aforementioned modules may be represented as a single module or a combination of different modules.

In operation, the input manager (IM) 230 receives one or more inputs from the TMS 108 which are used for creating universal test script for testing variants of a software application. For example, the IM 230 receives the plurality of test cases 212 from the user or from the TMS 108. Further, the IM 230 receives test parameters 214, test guidelines 216, test objects 218, test data 220 and test actions 222 from the user or from the TMS 108.

In an embodiment, the test guidelines 216 define the process and procedures for creating actions that is then used by the test automation system 112 to create automation script. The test actions 222 comprise actions which are required for the automation test script. As an example, the actions may include, click action, enter action, select an option from a drop-down list etc.

The test script generation module 226 receives as input the one or more test cases 212 to generate a universal test script. The test script generator module 226 parses the received test cases and identifies keyword functions and sequences corresponding to sequence of steps in the test cases. The keyword functions and the sequences are identified based on the action based words in the test cases. The action based words may include, but are not limited to, Input, Click, Enter etc. In an embodiment, the keyword functions are prebuilt functions. The keyword functions comprise test parameters, which enable binding of the relevant test objects and test data to the universal test script at run time. The universal test script generated by the test script generation module 226 is stored in the test management system 108.

In an embodiment, the test objects 218 comprise one or more objects for variants of the software application. Each of the one or more objects is identified by name and property of the object. As an example, the test objects 218 may include text boxes, tables, frames, list boxes, drop-down boxes etc. The test data comprises data which is required for execution of automated test script. The test data may vary based on the variant of the software application. In an embodiment, the test parameters 214 indicate the location of the test objects 218 and the test data 220 specific to the variant of the software application, which is referred to at runtime, during execution of the automation test script.

Figure 3:
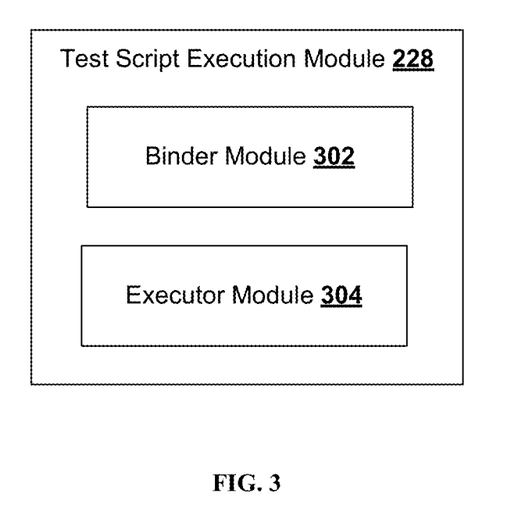
FIG. 3 illustrates a block diagram of a test script execution module in accordance with some embodiments of the present disclosure.

The execution of the automated test script is performed by the test script execution module 228. The test script execution module retrieves the automation test script which is generated by the test script generation module 226 and stored in the test management system 108. As illustrated in FIG. 3, the test script execution module 228 comprises a binder module 303 and an executor module 304 coupled with each other. The binder module 302 binds the test objects and test data based on the value specified in the test parameters. In an embodiment, the value of test parameters is provided as an input by the user. The binder module 302 creates a reference to the location where the test objects and test data specific to the variant of the application are stored. Further, the executor module 304 retrieves the generated universal test script from the test management system 108. Then, the executor module 304 connects with the test automation tool 110 of the server 104 to initiate execution of the universal test script.

The output module 232 of the test automation system 112 receives the output of the execution of universal test script from the test script execution module 228. In an embodiment, the output may include test results, screen shots etc. The output module 232 transmits the output results to the test management system 108 for storing and future use.

The test management system 108 is an external module that interfaces with the test automation system 112. The test management system 108 retrieves the one or more test cases provided by the user, store the universal test scripts and output of execution of the universal test script. The test automation tools 110 which execute the universal test script can be any standard test automation tool. In an embodiment, the test automation tools 110 captures the objects of software application under testing, and stores the captured objects in the test objects 218.

Figure 4:
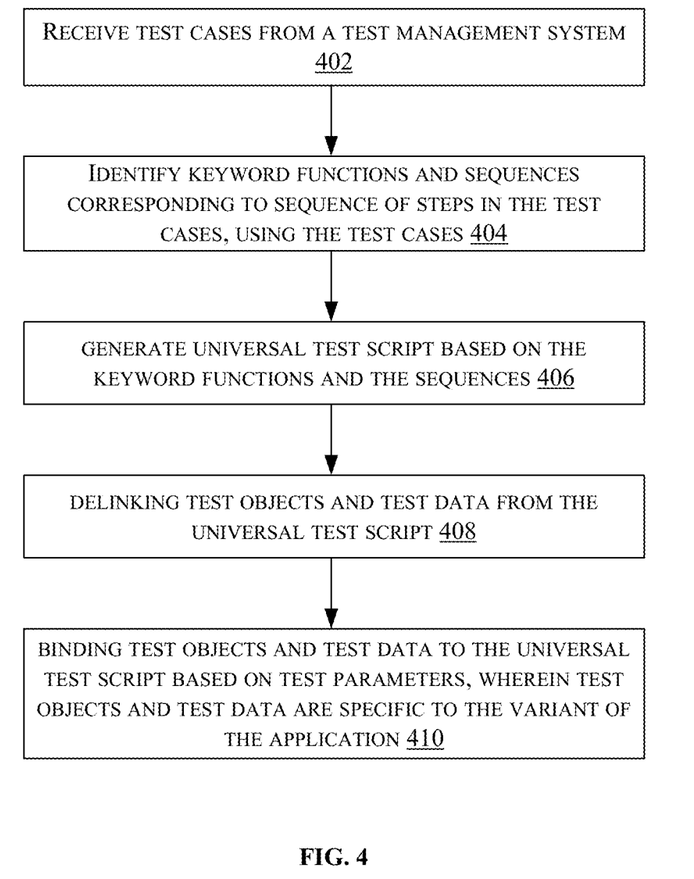
FIG. 4 illustrates a flowchart of method for creating universal test script for testing variants of a software application in accordance with some embodiments of the present disclosure.

FIG. 4 illustrates a flowchart of method of dynamic risk testing in accordance with an embodiment of the present disclosure.

As illustrated in FIG. 4, the method 400 comprises one or more blocks for creating universal test script for testing variants of a software application. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware, software, firmware, or combination thereof.

At block 402, receive test cases from a test management system 108. In an embodiment, the one or more test cases for creating a universal test script are retrieved from the test management system 108. The test cases received from the test management system 108 is populated in from of a table. In an embodiment, the tables may contain a plurality of instructions and their expected outcome. A sample illustration of the test cases is illustrated in Table A. The test case relates to placing an order in an online shopping portal.

TABLE A

| Step No. | Step Description | Expected Result |
| --- | --- | --- |
| Step 1 | Open Browser & Enter the Application Url as "OpenCartUrl" | Open cart home page should get displayed |
| Step 2 | Click on Login Link on the Home page | Login page should get displayed |
| Step 3 | Enter the Email Address as "EmailAddress" | Email address should get entered |
| Step 4 | Enter the Password as "Password" | Password should get entered |
| Step 5 | Click on Login Button | User should logged successfully to jcrew application |
| Step 6 | Search/Browse Products through Navigation or by Product Id or by Product Description as "Product" | User should enter the product id or product description |
| Step 7 | Click on Add to Bag Button | Selected product should get added to shopping cart trolley |
| Step 8 | Click on Shopping Bag Trolley on the Home Page | Shopping cart should get displayed |
| Step 9 | Verify the Shopping Bag Details & Enter the Country as "Country", State as "State" & Zip Code as "Zipcode" | Shopping bag details verified & Corresponding estimated tax and shipping calculated |
| Step 10 | Click on Get Quotes button | Shipping method page should get displayed |
| Step 11 | Select the Flat Shipping Rate Radio button & Click on Apply Shipping button | Shipping estimate has been applied |
| Step 12 | Click on Check Out button | If user already login to open cart account then checkout page should get displayed. 2. If user are not login toopen cart account then user have a choice of choosing guest checkout or registered checkout. 3. For continue as guest then click on Check Out as Guest button then checkout page should get displayed. 4. For registered check out enter the email address & password then checkout page should get displayed |
| Step 13 | Select the Existing Billing Address | Billing address selected |
| Step 14 | Select the New Delivery Address Radio button | Delivery details pane should get displayed |
| Step 15 | Enter the Delivery Details as Follows: 1. First Name as "FirstName" 2. Last Name as "Last Name" 3. Company Name as "Company" 4. Address 1 as "Address1" 5. Address 2 as "Address2" 6. City as "City" 7. Post Code as "Postcode" 8. Country as "Country" 9. State as "State" | Delivery details should get entered |

TABLE A-continued

| Step No. | Step Description | Expected Result |
| --- | --- | --- |
| Step 16 | Click on Continue button | Shipping method page should get displayed |
| Step 17 | Choose a Shipping Method as "ShippingMethod" & Click on Continue button | Appropriate shipping method should get selected & Payment page should get displayed |
| Step 18 | Choose the Payment Method as "PayMethod" Enter the Credit Card Details as Follows: 1. Card Number as "CardNum" 2. Name on the Card as "CardName" 3. Expiry Date Month as "ExpMon" 4. Expiry Date Yesr as "ExpYear" 5. Security Code as "SecCode" Click on Continue button | Appropriate payment method should get selected & Credit card details entered |
| Step 19 | Review the Order Details & Click on ConfirmOrder Button | 1. If System Validation fails then display error message. 2. If System Validation success then display order confirmation page |
| Step 20 | Close the Open Cart Application | Application closed |

At block 404, identify keyword functions and sequences corresponding to sequence of steps in the test cases, using the received test cases. In an embodiment, the test cases are written in high level languages. As an example, the test cases may be written in English language, as explained in Table A. The test cases written in English language is parsed and based on the standard actions based words in the test cases, the corresponding keyword functions and sequences corresponding to sequence of steps in the test cases are identified. As an example, the action based words may include, but are not limited to, Input, Click, Enter etc. which are present in the steps of test cases. The keyword functions are the functions prebuilt according to the action words.

Figure 5:
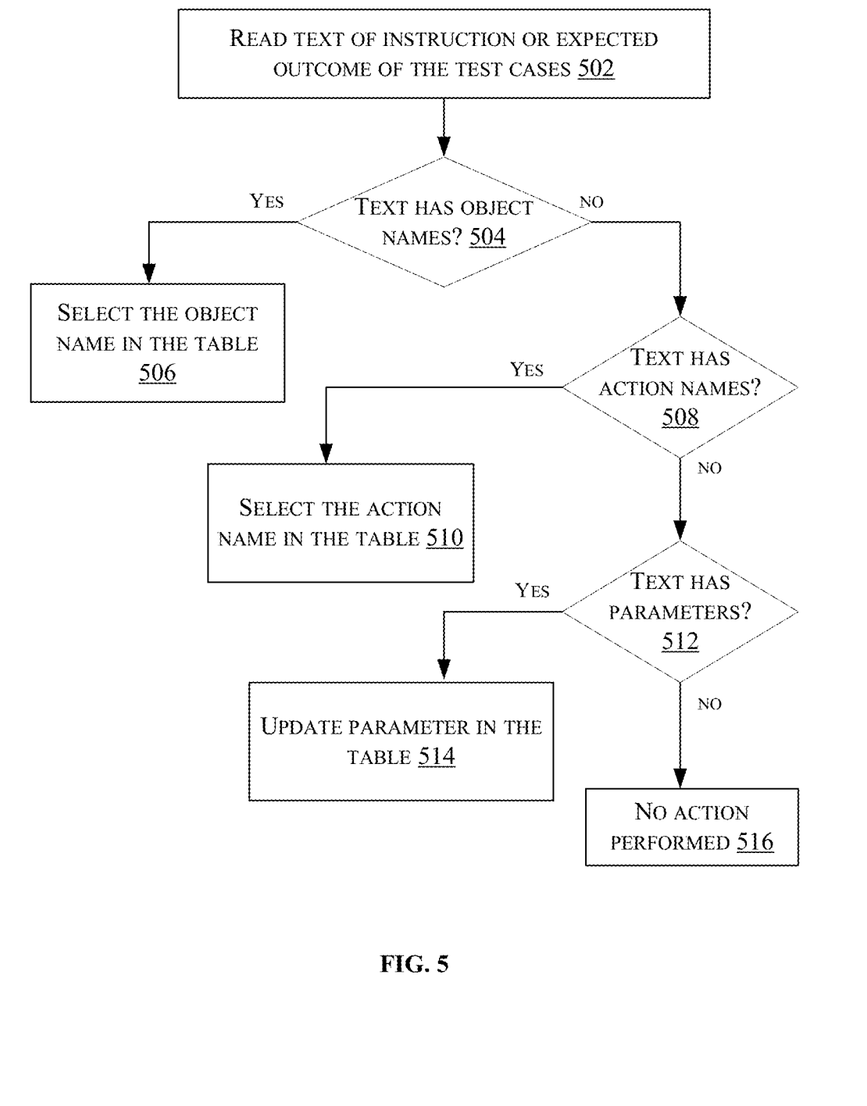
FIG. 5 illustrates a flowchart of method for segregating the test cases in accordance with some embodiments of the present disclosure.

In addition, the test cases are segregated into test objects, test actions and test parameters as illustrated in FIG. 5. In the segregation process, the test cases, which are in the plain language format, are parsed and the test objects, test actions and test parameters are segregated using the below steps. Each of the segregated item, i.e. test objects, test actions and test parameters is populated into a table.

At block 502, read the text comprising instructions or expected outcome of the test cases. At bock 504, a check is performed to determine if the text comprises name of any objects. If the text comprises object names, then the method proceeds to block 506 via "YES", otherwise to block 508 via "NO".

At block 506, the determined objects are selected and added to the table. At block 508, a check is performed to determine if the text comprises name of any actions. If the text comprises action names, then the method proceeds to block 510 via "YES", otherwise to block 512 via "NO".

At step 510, determined actions are selected and added to the table. At block 512, a check is performed to determine if the text comprises any parameters. If the text comprises parameters, then the method proceeds to block 514 via "YES", otherwise to block 516 via "NO".

At block 514, the determined parameters are selected and updated to the table. At block 516, the process of segregation test case is completed and no further action is taken. In an embodiment, once the segregation process is completed, the user can modify the data in the table or provide additional parameters or add additional steps to the table. Table B below shows a sample illustration of the segregated items of the test cases.

TABLE B

| Step Name | Screen Name | Object Name | Action | Parameter |
|---|---|---|---|---|
| Step 1 | | | LAUNCH | OpenCartUrl |
| Step 2 | YourStore | login | CLICK | |
| Step 3 | AccountLogin | email | INPUT | EmailAddress |
| Step 4 | AccountLogin | password | INPUT | Password |
| Step 5 | AccountLogin | Login | CLICK | |
| Step 6 | AccountLogin | PhonesandPDAs | CLICK | |
| Step 6 | PhonesandPDAs | HTCTouchHD | CLICK | |
| Step 7 | HTCTouchHD | AddtoCart | CLICK | |
| Step 8 | HTCTouchHD | ShoppingCart | CLICK | |
| Step 9 | ShoppingCart | EstimateShipping | CLICK | |
| Step 10 | ShoppingCart | GetQuotes | CLICK | |
| Step 11 | ShoppingCart | shippingmethod | CLICK | |
| Step 11 | ShoppingCart | ApplyShipping | CLICK | |
| Step 12 | ShoppingCart | Checkout | CLICK | |
| Step 13 | Checkout | ContinueBilling | CLICK | |
| Step 14 | Checkout | shippingaddress | CLICK | |
| Step 15 | Checkout | firstname | INPUT | FirstName |
| Step 15 | Checkout | lastname | INPUT | LastName |
| Step 15 | Checkout | company | INPUT | Company |
| Step 15 | Checkout | address 1 | INPUT | Address 1 |
| Step 15 | Checkout | city | INPUT | City |
| Step 16 | Checkout | ContinueShipping | CLICK | |
| Step 17 | Checkout | ContinueShipMethod | CLICK | |
| Step 18 | Checkout | agree | CLICK | |
| Step 18 | Checkout | ContinueOrder | CLICK | |
| Step 19 | Checkout | ConfirmOrder | CLICK | |
| Step 19 | OrderProcessed | Continue | CLICK | |
| Step 20 | YourStore | Logout | CLICK | |
| Step 20 | | | CLOSE | |

Figure 6:
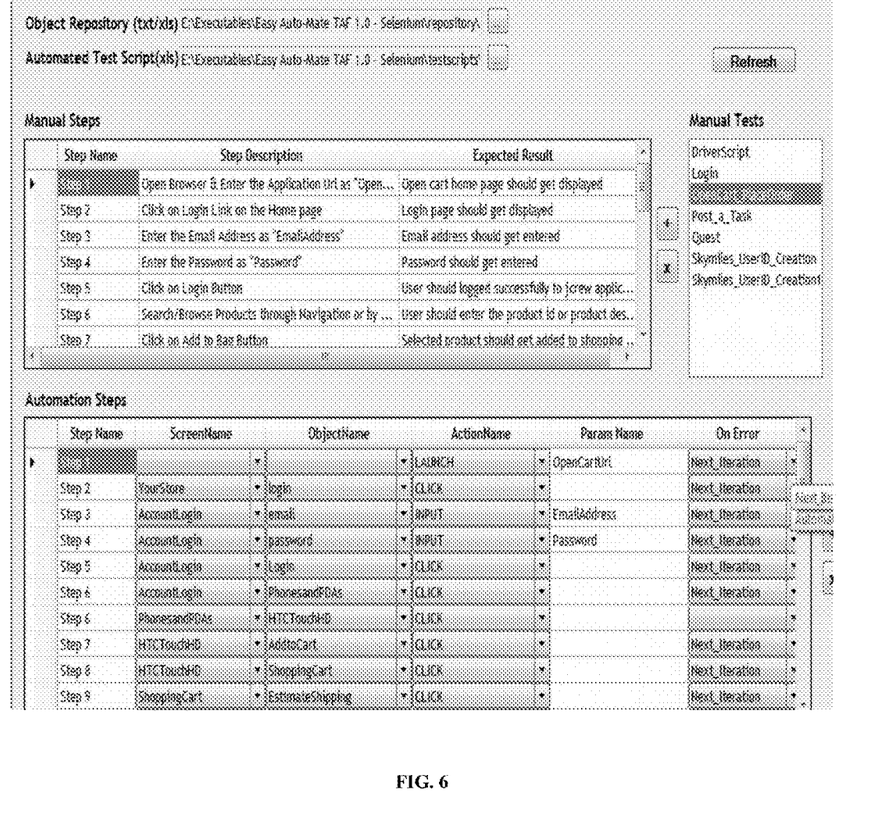
FIG. 6 illustrates an exemplary screenshot for script generation in accordance with some embodiments of the present disclosure.

Referring back to FIG. 4, at block 406, generate universal test script based on the keyword functions and the sequences. In an embodiment, the keyword functions contain the test parameters which enable binding of the test objects and the test data to the universal test script at runtime. The universal test script thus generated is stored in the test management system 108. FIG. 6 illustrates an exemplary screenshot for generation of universal test script in accordance with some embodiments of the present disclosure. The FIG. 6 illustrates an exemplary user interface which is used to create universal test scripts for executing variants of a software application.

Once the universal test script is generated, the test objects and test data are delinked from the universal test script at block 408. The delinking helps to use the same universal script for multiple test executions, based on variants of the application to be tested.

At block 410, the test objects and the test data specific to the variant of the application to be tested are binded to the universal test script, while executing the universal test script. In an embodiment, binding of the test objects and the test data is performed based on the value specified in the test parameters. In an exemplary embodiment, the parameter may be a browser, for which the data values may be Internet Explorer, Firefox and Chrome etc. During execution, the appropriate browser is selected based on the inputted parameter value and the test script is executed. The value of the test parameters may be provided as input by the user, using the input manager 230. During binding, a reference to the path where the test objects and the test data are stored is created, based on the parameter values. As an example, the reference may be maintained in a database or a spreadsheet which stores the actual reference of the test objects and the test data. A sample illustration of the stored reference is provided in Table C.

TABLE C

| Object Name | QTP ™ | Selenium ™ |
|---|---|---|
| Logout | Browser("Your Store_2").Page("Your Store").Link("Logout") | Link=Logout |
| Login | Browser("Your Store").Page("Your Store").Link("Login") | Link=Login |
| Shippingmethod | Browser("Your Store").Page("Shopping Cart").WebRadioGroup("shipping_met") | Id=flat.flat |
| Getquotes | Browser("Your Store").Page("Shopping Cart").WebButton("GetQuotes") | Id=button-quote |
| Applyshiping | Browser("Your Store").Page("Shopping Cart").WebButton("ApplyShipping") | Id=button-shipping |

| S. No | Test Name | Parameter1 | Parameter2 | Parameter3 | Parameter 4 |
|---|---|---|---|---|---|
| 1 | Order Creation | ST_AppURL=http://www.abc.com/us/en_us/ | Browser=IE | ST_Size=1 | ST_Qty |

This enables the runtime binding of the object and test data for universal test script. Once the binding is completed, the executor module 304 establishes the connection with the test automation tools 110 to initiate the execution of the universal test script.

The results of execution of the universal test script are provided to the output module 232, using the test automation tools. The results can be a simple file or a database. As an example, the result may be in the form of a simple Excel sheet. The test results rendered on to the output module 232 are updated into the test management system 108 automatically, after the completion of test execution by the test script execution module 228.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor or a processor capable of processing and executing the queries. The processor may be implemented as a central processing unit (CPU) for test automation system 112. The CPU may include one or more processing units having one or more processor cores or having any number of processors having any number of processor cores. CPU may include any type of processing unit, such as, for example, a multi-processing unit, a reduced instruction set computer (RISC), a processor having a pipeline, a complex instruction set computer (CISC), digital signal processor (DSP), and so forth. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. Moreover, the terms "first," "second," "third," and so forth, are used merely as labels, and are not intended to impose numerical requirements on their objects.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processor or by distributed processing units.

Additionally, advantages of present disclosure are illustrated herein.

In an embodiment, the present disclosure provides a method to accelerate the testing through automation of test cases. The automated test script is executes across all the variant releases when any change is made to the baseline software application In an embodiment of the present disclosure, the method provides better maintenance and quicker reuse of the scripts with different test data.

Finally, the language used in the specification has been principally selected for readability and instructional purposes, and it may not have been selected to delineate or circumscribe the inventive subject matter.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for testing an application, the method comprising:
   receiving, by a test automation computing device, one or more test cases written in a high level language from a data structure;
   identifying, by the test automation computing device, one or more keyword functions, and one or more test parameters for one or more of the keyword functions, based on the one or more test cases and one or more sequences corresponding to a sequence of steps in the one or more test cases by parsing the received one or more test cases based on one or more standard action words in the received one or more test cases;
   segregating, by the test automation computing device, the one or more test cases into one or more test actions corresponding to the one or more keyword functions, one or more test objects, and the one or more test parameters;
   generating, by the test automation computing device, a universal test script based on the one or more keyword functions comprising the one or more test parameters and the one or more sequences, wherein the universal test script facilitates testing of a plurality of variants of a baseline software application, wherein the one or more test parameters facilitate identification of corresponding test data specific to the variant of software application used during execution of the universal test script;
   executing, by the test automation computing device, the generated universal test script on an automation tool; and
   binding, by the test automation computing device and at runtime, the one or more test objects and the test data to the generated universal test script based on the one or more test parameters, wherein the one or more test parameters each comprise one or more values corresponding to one or more inputs to the one or more keyword functions and one or more of the test objects or a portion of the test data specific to the variant of the software application.

2. The method as set forth in claim 1, wherein the one or more keyword functions and the one or more sequences are generated by using one or more test guidelines.

3. The method as set forth in claim 1 further comprising storing, by the test automation computing device, the one or more test cases, the universal test script, and an output of the execution of the universal test script.

4. A test automation computing device comprising:
   a memory comprising programmed instructions stored in the memory; and one or more physical processors executing the programmed instructions stored in the memory to:
   receive one or more test cases written in a high level language from a data structure into the test automation computing device;
   identify one or more keyword functions, and one or more test parameters for one or more of the keyword functions, based on the one or more test cases and one or more sequences corresponding to a sequence of steps in the one or more test cases by parsing the received one or more test cases based on one or more standard action words in the received one or more test cases;
   segregate the one or more test cases into one or more test actions corresponding to the one or more keyword functions, one or more test objects, and the one or more test parameters;
   generate a universal test script based on the one or more keyword functions comprising the one or more test parameters and the one or more sequences, wherein the universal test script facilitates testing of a plurality of variants of a baseline software application, wherein the one or more test parameters facilitate identification of corresponding test data specific to the variant of software application used during execution of the universal test script;
   execute the generated universal test script on an automation tool; and
   bind, at runtime, the one or more test objects and the test data to the generated universal test script based on the one or more test parameters, wherein the one or more test parameters each comprise one or more values corresponding to one or more inputs to the one or more keyword functions and one or more of the test objects or a portion of the test data specific to the variant of the software application.

5. The device as set forth in claim 4, wherein the one or more keyword functions and the one or more sequences are generated by using one or more test guidelines.

6. The device as set forth in claim 4, wherein the one or more processors are further configured to be capable of executing the programmed instructions stored in the memory to store the one or more test cases, the universal test script, and an output of the execution of the universal test script.

7. A non-transitory computer readable medium having stored thereon instructions for creating a universal test script comprising machine executable code which, when executed by a processor causes the processor to perform steps comprising:
   receiving one or more test cases written in a high level language from a data structure in a test automation computing device;
   identifying one or more keyword functions, and one or more test parameters for one or more of the keyword functions, based on the one or more test cases and one or more sequences corresponding to a sequence of steps in the one or more test cases by parsing the received one or more test cases based on one or more standard action words in the received one or more test cases;
   segregating the one or more test cases into one or more test actions corresponding to the one or more keyword functions, one or more test objects, and one or more test parameters;
   generating a universal test script based on the one or more keyword functions comprising the one or more test parameters and the one or more sequences, wherein the universal test script facilitates testing of a plurality of variants of a baseline software application, wherein the one or more test parameters facilitate identification of corresponding test data specific to the variant of software application used during execution of the universal test script;
   executing the generated universal test script on an automation tool; and
   binding, at runtime, the one or more test objects and the test data to the generated universal test script based on the one or more test parameters, wherein the one or more test parameters each comprise one or more values corresponding to one or more inputs to the one or more keyword functions and one or more of the test objects or a portion of the test data specific to the variant of the software application.

8. The medium as set forth in claim 7, wherein the keyword functions and the sequences are generated by using one or more test guidelines.

9. The medium as set forth in claim 7 having stored thereon one or more additional instructions comprising machine executable code which, when executed by the processor causes the processor to perform one or more additional steps comprising storing the one or more test cases, the universal test script, and an output of the execution of the universal test script.

* * * * *